United States Patent [19]

Fatehpour et al.

[11] Patent Number: 5,787,763
[45] Date of Patent: Aug. 4, 1998

[54] PROCESS FOR MANUFACTURING A CONNECTING ROD MADE OF SHEET METAL

[75] Inventors: Edison Fatehpour, Koblenz; Walter Grimm, Solms; Berthold Koch, Herschbach, all of Germany

[73] Assignee: Griwe Innovative Umformtechnik GmbH, Germany

[21] Appl. No.: 619,494

[22] PCT Filed: Oct. 25, 1994

[86] PCT No.: PCT/EP94/03502

§ 371 Date: Jul. 22, 1996

§ 102(e) Date: Jul. 22, 1996

[87] PCT Pub. No.: WO95/12467

PCT Pub. Date: May 11, 1995

[30] Foreign Application Priority Data

Nov. 1, 1993 [DE] Germany ............ 43 37 127.2
Jan. 8, 1994 [DE] Germany ............ 44 00 386.2
Jun. 10, 1994 [DE] Germany ............ 44 20 265.2

[51] Int. Cl.[6] .................................................. G05G 1/00
[52] U.S. Cl. ................. 74/579 E; 74/588; 29/888.092
[58] Field of Search ................. 74/579 R, 579 E, 74/588; 29/888.092; 92/140, 157; 123/56.3, 197.3

[56] References Cited

U.S. PATENT DOCUMENTS

| 1,766,024 | 6/1930 | Jones | 74/579 E |
| 1,829,305 | 10/1931 | Sneed | 74/579 R |
| 2,120,016 | 6/1938 | Bugatti | 74/588 |
| 3,736,639 | 6/1973 | Leffers | 74/579 R |
| 3,815,431 | 6/1974 | Alvarez | 74/579 E |
| 3,822,609 | 7/1974 | Kotoc | 74/579 E |
| 4,207,779 | 6/1980 | Papst | 74/579 R |
| 4,369,742 | 1/1983 | Everts | 74/579 E |
| 4,480,498 | 11/1984 | Konig | 74/579 R |
| 4,939,952 | 7/1990 | Romer et al. | 74/579 E |

*Primary Examiner*—Vinh T. Luong
*Attorney, Agent, or Firm*—Larson & Taylor

[57] ABSTRACT

A one-piece or multi-part connecting rod includes a connecting rod eye, connecting rod shaft and a connecting rod head which is manufactured from at least one sheet metal strip. The sheet metal strip is shaped on both sides with essentially perpendicular fins and is bent normal to its main planed formed cylindrical or semi-cylindrical bearing surfaces about the bearing axes of the connecting rod head and connecting rod eye. The sheet metal pieces are fastenable near the bearing surfaces. The sheet metal connecting rods thus produced can be moved in automobile engines.

11 Claims, 3 Drawing Sheets

PROCESS FOR MANUFACTURING A CONNECTING ROD MADE OF SHEET METAL

FIELD OF THE INVENTION

The invention relates to a method for producing a one-piece or multi-piece connecting rod with a connecting rod eye, connecting rod shaft and/or connecting rod head from at least one sheet metal strip, which is formed with essentially perpendicularly angled-off edge strips on both sides and is bent normally in respect to its main plane into cylindrical or semi-cylindrical support surfaces around the bearing axes of the connecting rod head and/or the connecting rod eye, and all sheet metal elements which define separating gaps in the bearing surfaces of the connecting rod are fixed in place in the immediate vicinity of the bearing surfaces. The invention furthermore relates to a connecting rod made of sheet metal.

BACKGROUND OF THE INVENTION

Connecting rods - are mostly produced by forging processes today. Forged connecting rods have a relatively great weight, which makes the balancing of the masses of the crank mechanism difficult. This problem in regard to the balancing of the masses is even increased because the finished weights of the connecting rods are subject to large variations, which are compensated by weighing the connecting rods individually and then assembling them in the crank mechanism when they have been sorted out. When employing one-piece crankshafts, connecting rods with divided connecting rod heads are required. This means that the forged connecting rod must be opened at the connecting rod head and subsequently re-assembled with difficulties arising on account of exact centering. As a whole, the forging process for producing connecting rods is elaborate and expensive.

Lately, more and more connecting rods are produced by means of the sintering method. Although this method does not provide any essential cost advantages for production, the connecting rods produced in accordance therewith are lighter and more constant in their weight than forged connecting rods. For this reason the high-cost weighing process can be omitted. For dividing the connecting rod head, its lower half is directedly broken off. The three-dimensional break structure being created in the process is used as the centering means in the assembly of the crank mechanism and is furthermore able to transmit axial and radial forces between the halves of the connecting rod head.

Titanium connecting rods are also known which do have excellent sturdiness characteristics, but which are very expensive to manufacture. For this reason they are preferably employed in job lot sizes in connection with the highest requirements.

Production methods for sheet metal connecting rods are also known, wherein the sheet metal body is located perpendicularly in respect to the bearing axes of the connecting rod eye and the connecting rod head, and shaping takes place axially in respect to the bearing axis direction, see DE-OS 30 06 240 and DE-OS 38 01 802. The connecting rods produced by means of these simple and inexpensive methods are very light, however, they have no great stiffness values. They are therefore only suitable for subordinate uses. In addition, designs with a divided connecting rod head for one-piece crankshafts are difficult to produce.

Finally, a connecting rod made of sheet metal is known from the Japanese patent application publication JP-A-57173610 (Patent Abstracts of Japan, Vol. 7, No. 16 (M-187)), wherein a sheet metal strip with edge strips is bent in the center area, normally in respect to its main plane, into a cylindrical support surface around the bearing axis of the connecting rod eye, and at the ends into a semi-cylindrical bearing surface around the bearing axis of the connecting rod head. With this shape the connecting rod shaft consists of a double layer of sheet metal, so that in this case, too, a comparatively large mass is the result. In addition, the separating gap of the connecting rod head is located normally in respect to the main load direction, which is disadvantageous.

It is the object of the invention to provide a method of the kind mentioned at the outset, which results in a light and simultaneously rigid connecting rod and which possibly permits the production of a multi-piece connecting rod without difficulties and without later cutting.

This object is attained in accordance with the invention in that a single sheet metal element, which constitutes the connecting rod shaft, is bent at one end cylindrically around the bearing axis of the connecting rod eye and at its other end semi-cylindrically or cylindrically around the bearing axis of the connecting rod head.

A quick, simple and energy-saving production process results because of cold-forming of the connecting rod during bending and deep-drawing processes. The connecting rods produced in this way are very light and are subject to only small variations in weight. The balancing of the masses is simplified by this, and only relatively small counterweights need to be provided on the crankshaft. The essentially U-shaped cross section of the connecting rod provides great flexural strength. The further advantage is offered, that it is possible to take the dividing of the connecting rod head already into consideration during the production process and therefore the subsequent cutting open of the support surfaces is omitted. In order to achieve a good fit of the support surfaces for receiving bearing elements in the connecting rod eye and the connecting rod head, the sheet metal elements which abut against each other in the separating gaps of the support surfaces are formed with centering means. These sheet metal elements are furthermore temporarily fixed in place, possibly after a heat treatment of the connecting rod, and the support surfaces are fine machined.

The sheet metal elements can be fixed in place by means of screwing, joining or clamping connections, wherein the connection of the divided connecting rod head must be released again after the fine machining in order to finally mount the connecting rod on the bearing journal of the crankshaft. In the process, the bearing half-shells which must be disposed between the bearing surfaces and the crank journal are anchored in the separating gaps by means of retaining lugs formed on them. A bearing bush is clamped in the connecting rod eye and receives the piston bolt.

If screw connections are employed, spacers should be preferably provided between the respective screw heads and the connecting rod and/or between the nut and the connecting rod, so that long screws can be used for bracing the sheet metal elements.

In connection with screw connections under vibration or shock loads, long screws have the advantage in comparison with short ones that they have a higher shape-changing property even in the prestressed state and are therefore able to reduce tensile peaks by elastic deformation, because of which the load on the screw shaft is reduced.

These screws can also be embodied as necked-down bolts, since customary rigid screws with continued thread have an unfavorable notch behavior at the transition between the screw head and the first thread. Necked-down bolts which, because of their special shaft formation, are also superior to customary screws in their shape-changing abilities, have lower notch numbers in the critical shaft cross sections and, because of the resultant advantageous stress distribution, can be stressed to a higher degree in particular in the case of vibrating loads, such as are present in the connections of the connecting rod.

If space limitations require, the edge strips of the sheet metal strip can be flattened or completely removed in places. For practical reasons this is done prior to the bending process of the sheet metal strip, which is simplified by this.

If vibrations of the edge strips should occur in the area of the connecting rod shaft, vibration dampers should be provided between them.

Steel with comparatively great shape-changing abilities, which has a great strength either because of its microalloyed fine grain structure or because of the possibility of a tempering process after the sheet metal deformation, is suitable as the material for the connecting rod elements.

BRIEF DESCRIPTION OF THE DRAWINGS

Since the connecting rods produced in accordance with the above described method and its modifications are also a subject of the invention, three exemplary embodiments of connecting rods in accordance with the invention are presented below.

DESCRIPTION OF THE PREFERRED EMBODIMENTS

Figure 1:
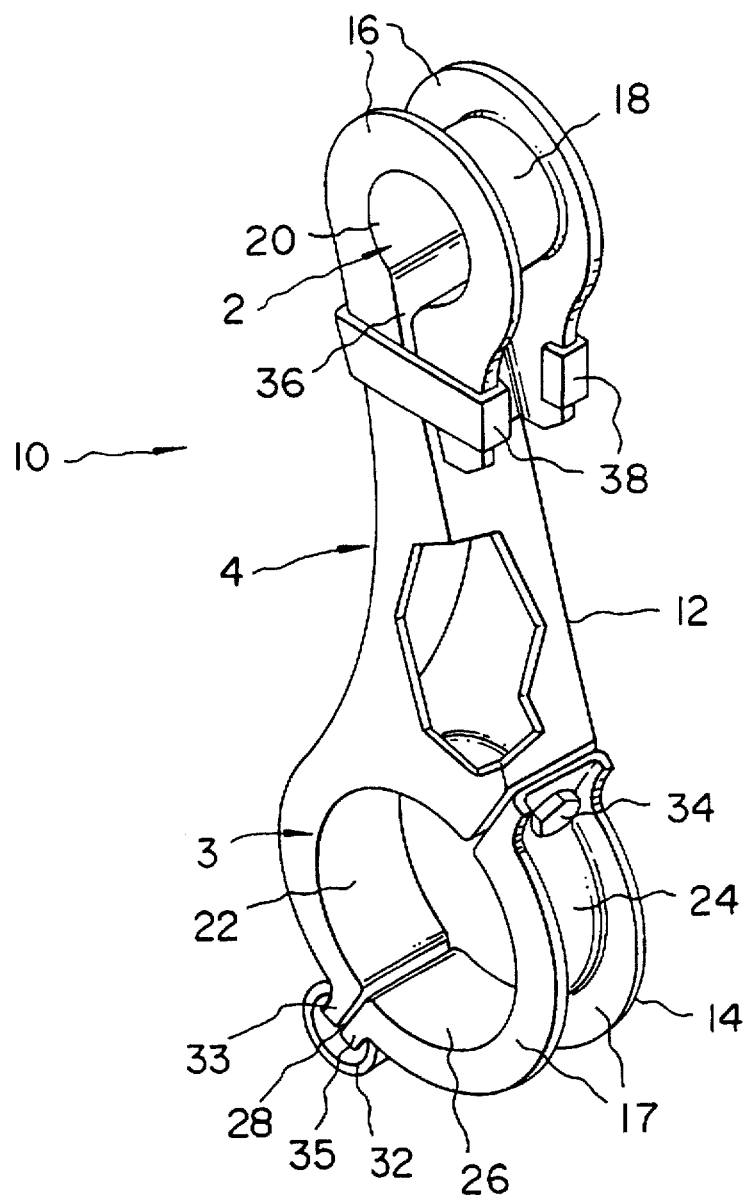
FIG. 1 shows a connecting rod made of two sheet metal strips, with a divided connecting rod head.

A connecting rod 10 represented in FIG. 1 consists of two sheet metal elements 12, 14 with perpendicularly angled edge strips 16, 17. The upper sheet metal strip 12 was bent, normally in respect to its main plane 18, at its one end into a cylindrical bearing surface 20 around the bearing axis of the connecting rod eye 2, and at its other end into a semi-cylindrical bearing surface 22 around the bearing axis of the connecting rod head 4. A drawn-in partial section in the connecting rod shaft 4 clearly shows the structure of the sheet metal connecting rod 10 in the shape of a letter U.

The lower sheet metal element 14 was formed, normally in respect to its main plane 24, into a connecting rod bearing cover with a semi-cylindrical bearing surface 26. Because of the division, separating gaps 28, 30 occur between the bearing surfaces 22, 26 of the upper sheet metal element 12 and the lower sheet metal element 14. The sheet metal elements 12, 14 are provided with fastening surfaces, extending radially in respect to the bearing surfaces 22, 26, in the area of the separating gaps 28, 30. Actual fastening occurs in the area of the lower separating gap 28 by means of the clamp 32, which presses together the ends 33, 35 of the sheet metal parts 12, 14, which are formed on them as fastening tongues. Clamping of the two sheet metal elements takes place at the upper separating gap 30 of the connecting rod head 3 with the aid of a screw 34 and a nut (not shown).

Since the bearing surface 20 of the connecting rod eye 2 also has a separating gap 36, it is also necessary to fasten the sheet metal pieces which delimit it. In the embodiment represented in FIG. 1, clamps 38 are placed on the edge strips 16 of the upper sheet metal element 12 in such a way that they prevent the connecting rod eye 2 from bending open. For this purpose the edge strips can be provided with teeth, ribbing or protrusions in order to assure interlocking with the clamps 38.

To assist rigidity at the separating gaps 28, 30 and 36, the connecting elements 32, 34, 38 are disposed near the bearing surfaces.

Because of the divided connecting rod head, 3, the connecting rod 10 is suitable for one-piece crankshafts.

A one-piece embodiment, not shown, of the connecting rod 10 is particularly suited for crankshafts with freely accessible bearing journals.

Figure 2:
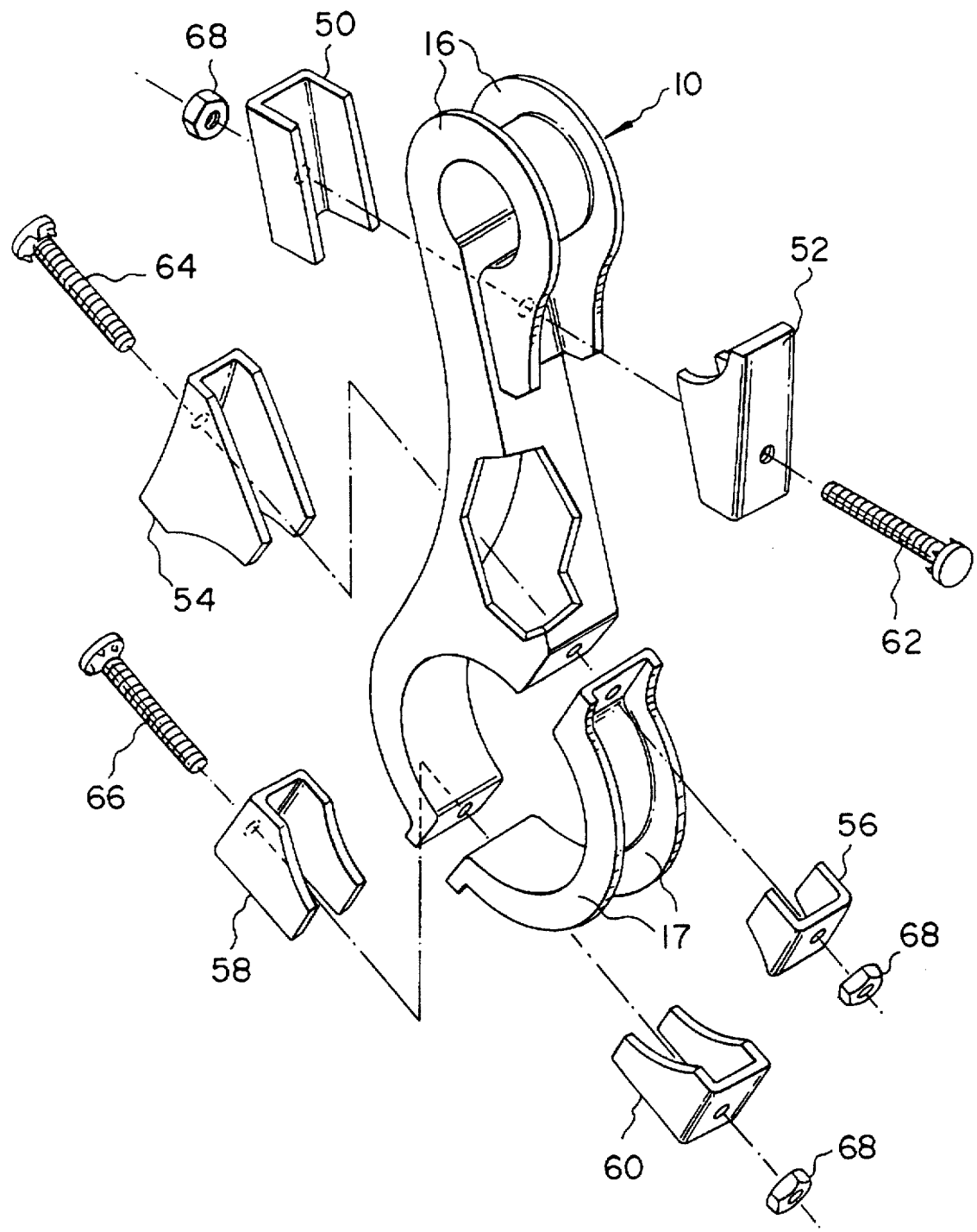
FIG. 2 shows a connecting rod in accordance with FIG. 1 with spacers and long tightening screws.
Figure 3:
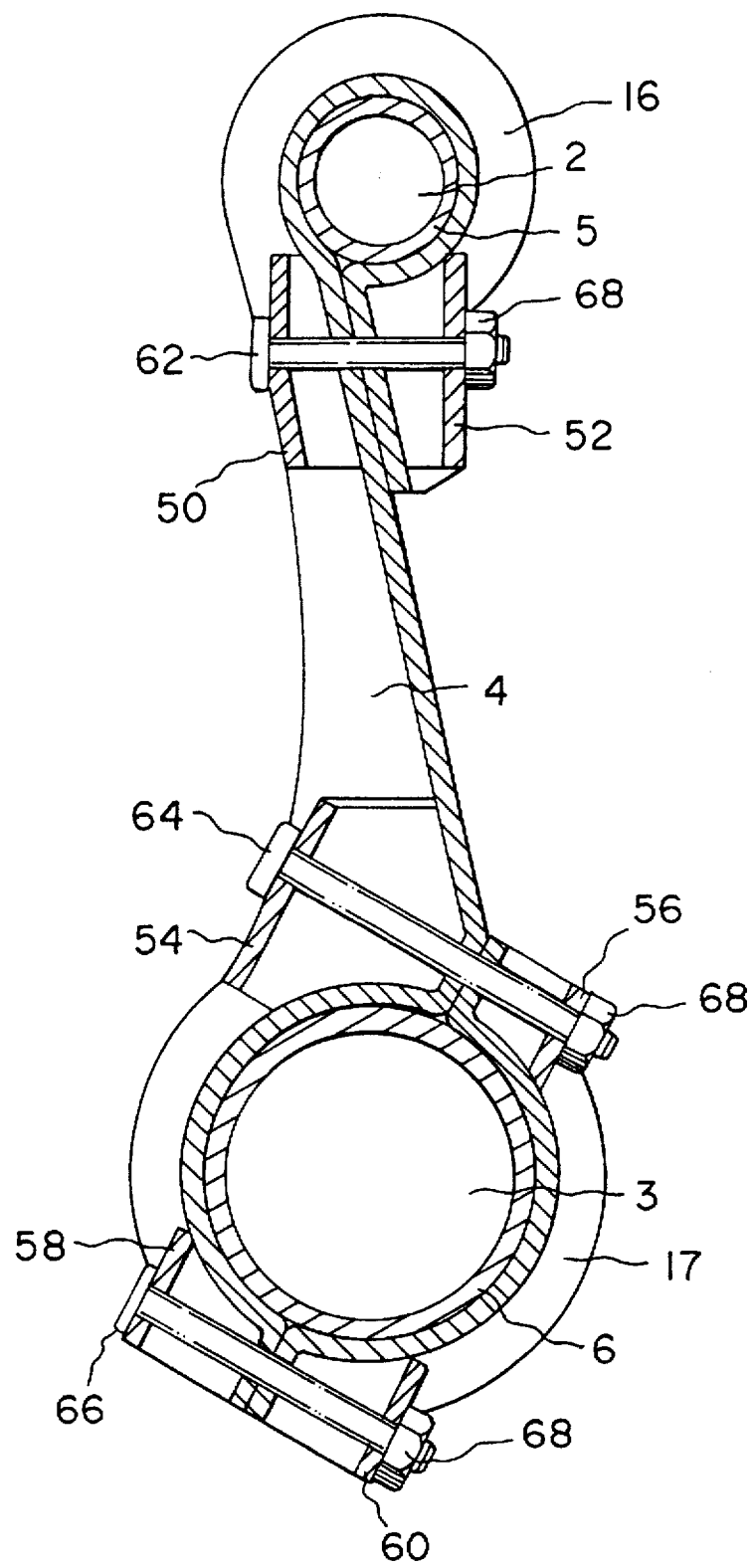
FIG. 3 shows a longitudinal sectional view of the connecting rod of FIG. 2.

FIG. 2 shows the connecting rod 10 of FIG. 1 with spacers 50, 52, 54, 56, 58, 60, which allow the employment of long tightening screws 62, 64, 66. The spacers are essentially embodied as U-shaped sheet metal brackets, wherein the edges of the lateral legs of the sheet metal brackets are shaped to fit the respective installed position in such a way that they rest on the connecting rod body with their full length and that the base surfaces of respectively two oppositely located sheet metal brackets, which are designed as a rest for the screw heads or associated nuts 68, are parallel with their surfaces in the assembled state. This geometry can be seen in FIG. 3. The bores in the base surfaces of the sheet metal brackets must furthermore be aligned with the associated bores in the body of the connecting rod, so that the screws do not become canted during installation. Bearing bushes 5, 6 may be clamped in the connecting rod eye 2 and connecting rod head 3, respectively.

The arrangement of the sheet metal brackets between the support strips 16, 17 of the connecting rod 10 provides additional stability for the latter. In addition, the sheet metal brackets act as vibration dampers for the edge strips 16, 17, which results in advantages regarding the fatigue strength and the acoustical behavior of the connecting rod 10.

In order to additionally improve the stable properties of the screw connections, it is possible to employ necked-down bolts with specially formed expansion shafts instead of the rigid screws shown.

We claim:

1. A method of producing a connecting rod having a connecting rod eye, a connecting rod shaft and a connecting rod head comprising the steps of:

obtaining a sheet metal strip having substantially perpendicularly angled-off edge strips on both sides thereof;

bending said sheet metal strip normally in respect to a main plane thereof around a bearing axis of the connecting rod eye to form a cylindrical bearing surface, edges of said metal strip forming a separating gap in an immediate vicinity of the bearing surface; and bending said sheet metal strip normally in respect to a main plane thereof around a bearing axis of the connecting rod head to form one of a semi-cylindrical and a cylindrical bearing surface, edges of said sheet metal strip forming at least one separating gap in an immediate vicinity of the bearing surface.

2. The method according to claim 1 further comprising the steps of temporarily fixing the separating gaps of the bearing surfaces in place and fine machining the bearing surfaces.

3. The method according to claim 1 wherein the metal strip is bent around the bearing axis of the connecting rod head to form a semi-cylindrical bearing surface and further comprising the step of bending a second sheet metal strip around the bearing axis of the connecting rod head to form a semi-cylindrical bearing surface for completing the connecting rod head.

4. A connecting rod having a connecting rod shaft, a connecting rod eye and a connecting rod head, said connecting rod comprising a sheet metal element extending in a main plane parallel with bearing axes of the connecting rod eye and the connecting rod head and having edge strips on both sides substantially perpendicularly angled off, said sheet metal element being bent at one end cylindrically around the bearing axis of the connecting rod eye and bent at an opposite end in one of a cylindrical and a semi-cylindrical shape around the bearing axis of the connecting rod head to form bearing surfaces, edges of the sheet metal element defining separating gaps in the bearing surfaces of the connecting rod.

5. The connecting rod according to claim 4 wherein the connecting rod head has a semi-cylindrical shape and the connecting rod comprises a second sheet metal element having substantially perpendicularly angled off edge strips and semi-cylindrically bent around the bearing axis of the connecting rod head for completing the connecting rod head.

6. The connecting rod according to claim 5 wherein said two sheet metal elements define two separating gaps in the bearing surface of the connecting rod head, said separating gaps being inclined in a longitudinal direction of the connecting rod shaft.

7. The connecting rod according to claim 4 wherein ends of the sheet metal elements are shaped to form fastening tongues.

8. The connecting rod according to claim 7 further comprising clamps securable to at least one of said fastening tongues and said edge strips.

9. The connecting rod according to claim 4 further comprising a bearing bush disposed in at least one of the connecting rod eye and the connecting rod head inside the bearing surfaces.

10. The connecting rod according to claim 4 further comprising screws and nuts for fixing in place the separating gaps of the bearing surfaces.

11. The connecting rod according to claim 10 further comprising spaces positioned between the connecting rod and at least one of the nuts and heads of the screws.

* * * * *